United States Patent
Zhu et al.

(10) Patent No.: US 7,755,486 B2
(45) Date of Patent: Jul. 13, 2010

(54) EXPANDED COMPATIBILITY RFID TAGS

(75) Inventors: Liping Julia Zhu, San Jose, CA (US); Allan Michael Evans, Cupertino, CA (US); Steven J. Farrell, Sunnyvale, CA (US); Don Ahn, Sunnyvale, CA (US)

(73) Assignee: Savi Technology, Inc., Sunnyvale, CA (US)

( * ) Notice: Subject to any disclaimer, the term of this patent is extended or adjusted under 35 U.S.C. 154(b) by 756 days.

(21) Appl. No.: 11/535,482

(22) Filed: Sep. 26, 2006

(65) Prior Publication Data

US 2007/0085688 A1    Apr. 19, 2007
US 2008/0088461 A9    Apr. 17, 2008

Related U.S. Application Data

(63) Continuation-in-part of application No. 10/841,368, filed on May 6, 2004, now Pat. No. 7,173,530, and a continuation-in-part of application No. 11/009,691, filed on Dec. 9, 2004, now abandoned.

(60) Provisional application No. 60/799,242, filed on May 9, 2006.

(51) Int. Cl.
G08B 9/00      (2006.01)
G08B 1/08      (2006.01)
G08B 13/14     (2006.01)
H04Q 5/22      (2006.01)

(52) U.S. Cl. ............................. 340/572.1; 340/539.13; 340/10.1; 340/286.02

(58) Field of Classification Search ........................ None
See application file for complete search history.

(56) References Cited

U.S. PATENT DOCUMENTS

| 4,688,244 A | 8/1987 | Hannon et al. |
| 4,750,197 A | 6/1988 | Denekamp et al. |
| 5,565,858 A | 10/1996 | Guthrie |
| 5,568,858 A | 10/1996 | Thompson |

(Continued)

FOREIGN PATENT DOCUMENTS

CN          1283272 A         2/2001

OTHER PUBLICATIONS

Chinese Office Action, Chinese Application No. 200480041282.4, Aug. 12, 2008, 9 pages.

(Continued)

*Primary Examiner*—Julie Lieu
(74) *Attorney, Agent, or Firm*—Fenwick & West LLP

(57) ABSTRACT

Systems and methods for providing expanded compatibility in identification tags such as RFID (Radio Frequency Identification) devices. Integrated devices can be equipped with various combinations of passive and active tags configured for compatibility with passive and active readers, respectively. Additionally, the integrated devices can be equipped with various combinations of passive and active tag readers for compatibility with passive and active tags, respectively. A first combination comprises an active tag and a passive tag reader for collecting information over a passive channel, and sending the information over an active channel. A second combination comprises an active tag and a passive tag receiver/transceiver for communication over both active and passive channels. A third combination comprises an active tag and an active tag reader for collecting information over an active channel, and sending information over an active channel.

27 Claims, 11 Drawing Sheets

U.S. PATENT DOCUMENTS

| | | | |
|---|---|---|---|
| 5,835,012 A | 11/1998 | Wilk | |
| 5,841,365 A | 11/1998 | Rimkus | |
| 5,892,441 A | 4/1999 | Woolley et al. | |
| 5,959,568 A | 9/1999 | Woolley | |
| 6,002,343 A | 12/1999 | Auerbach et al. | |
| 6,061,644 A | 5/2000 | Leis | |
| 6,148,291 A | 11/2000 | Radican | |
| 6,211,781 B1 | 4/2001 | McDonald | |
| 6,438,359 B1 | 8/2002 | Bossard et al. | |
| 6,542,114 B1 | 4/2003 | Eagleson et al. | |
| 6,662,068 B1 | 12/2003 | Ghaffari | |
| 6,714,121 B1 | 3/2004 | Moore | |
| 6,720,888 B2 | 4/2004 | Eagleson et al. | |
| 6,753,775 B2 | 6/2004 | Auerbach et al. | |
| 6,765,484 B2 | 7/2004 | Eagleson et al. | |
| 6,804,578 B1 | 10/2004 | Ghaffari | |
| 6,820,805 B2 | 11/2004 | Stevens | |
| 6,879,257 B2 | 4/2005 | Hisano et al. | |
| 6,888,241 B1 | 5/2005 | Korn et al. | |
| 6,927,687 B2 | 8/2005 | Carrender | |
| 6,940,392 B2 | 9/2005 | Chan et al. | |
| 6,943,678 B2 | 9/2005 | Muirhead | |
| 6,972,682 B2 | 12/2005 | Lareau et al. | |
| 6,973,385 B2 | 12/2005 | Ulrich | |
| 7,005,985 B1 | 2/2006 | Steeves | |
| 7,042,354 B2 | 5/2006 | Auerbach et al. | |
| 7,075,412 B1 | 7/2006 | Reynolds et al. | |
| 7,075,441 B2 | 7/2006 | Tsukamoto | |
| 7,194,438 B2 | 3/2007 | Sovio et al. | |
| 7,479,877 B2* | 1/2009 | Mortenson et al. | 340/545.6 |
| 7,525,431 B2* | 4/2009 | Britton et al. | 340/572.1 |
| 7,537,160 B2* | 5/2009 | Silverbrook et al. | 235/440 |
| 2001/0018672 A1 | 8/2001 | Petters et al. | |
| 2002/0029178 A1 | 3/2002 | Wiederin et al. | |
| 2003/0011474 A1 | 1/2003 | Ng | |
| 2003/0125980 A1 | 7/2003 | Ribeiro | |
| 2003/0227382 A1 | 12/2003 | Breed | |
| 2003/0227392 A1 | 12/2003 | Ebert et al. | |
| 2004/0100379 A1 | 5/2004 | Boman et al. | |
| 2004/0153344 A1 | 8/2004 | Bui et al. | |
| 2005/0109845 A1 | 5/2005 | Ghaffari | |
| 2005/0110636 A1 | 5/2005 | Ghaffari | |
| 2005/0215280 A1* | 9/2005 | Twitchell, Jr. | 455/553.1 |
| 2005/0231365 A1 | 10/2005 | Tester et al. | |
| 2005/0237184 A1 | 10/2005 | Muirhead | |
| 2005/0241548 A1 | 11/2005 | Muirhead | |
| 2005/0248438 A1 | 11/2005 | Hughes et al. | |
| 2005/0288937 A1 | 12/2005 | Verdiramo | |
| 2006/0152366 A1 | 7/2006 | Sironi et al. | |
| 2006/0220829 A1* | 10/2006 | Johnson | 340/505 |
| 2007/0115125 A1* | 5/2007 | Lyon et al. | 340/572.1 |
| 2007/0164857 A1 | 7/2007 | Odenwald et al. | |
| 2007/0282482 A1* | 12/2007 | Beucher et al. | 700/225 |
| 2007/0285241 A1* | 12/2007 | Griebenow et al. | 340/572.1 |

OTHER PUBLICATIONS

Engels, D.W., "RFID: The New Technical Reality," FTC: RFID: Applications and Implications for Consumers, presented Jun. 21, 2004, Washington, D.C., [online] [Retrieved on Nov. 28, 2007] Retrieved from the Internet<URL:http://www.ftc.gov/bcp/workshops/rfid/engels.pdf>.
PCT International Search Report and Written Opinion, PCT/US07/68591, Feb. 20, 2008, 8 pages.
Chinese Office Action, Chinese Patent Application No. 200480011962.1, Jan. 16, 2009, 15 pages.
"Guidance from AIM Global's RFID Expert Group: Proposed Guidelines for the Use of RFID-Enabled Labels in Military Logistics: Recommendations for Revision of MIL-STD-129," AIM Global, May 13, 2005, 39 pages.
"The Intermec® Guide to RFID Reader Selection," Intermec Technologies Corporation, 2004, 6 pages.
International Search Report and the Written Opinion, PCT/US04/41501, Nov. 3, 2005, 11 pages.
Notification of the International Search Report and Written Opinion, PCT/US04/11086, Sep. 5, 2006, 10 pages.
Notification of Transmittal of the International Search Report and the Written Opinion, PCT/US04/14192, Jan. 18, 2006, 8 pages.
Notification Of The International Search Report Or The Declaration and Written Opinion Of The International Searching Authority, PCT/US04/14206, Apr. 28, 2005, 9 pages.
Notification of Transmittal of the international Search Report and the Written Opinion of the International Searching Authority, or the Declaration, PCT Application No. PCT/US04/15166, Sep. 6, 2005, 6 pages.
"RFID Overview: Introduction to Radio Frequency Identification," Intermec Technologies Corporation, 1999, pp. 1-7.
"RFID Product Requirements for the Savi Total Asset Visibility Portable Deployment Kit," 2004, Savi Technology, Inc., 25 pages.
"Savi® Portable Deployment Kit," Active RFIDTechnology, Savi Technology, 1 page.
"Supply Chain RFID: How It Works and Why It Pays," Intermec Technologies Corporation, 2004, pp. 1-12.
Chinese Office Action, Chinese Application No. 200480041282.4, Jan. 8, 2010, 13 pages.

* cited by examiner

EXPANDED COMPATIBILITY RFID TAGS

CROSS-REFERENCE TO RELATED APPLICATIONS

The present invention claims priority under 35 U.S.C. §119(e) from U.S. Provisional Application Ser. No. 60/799,242, filed May 9, 2006, and is a continuation-in-part of U.S. patent application Ser. No. 10/841,368, entitled Nested Visibility for a Container Hierarchy and filed on May 6, 2004, now U.S. Pat. No. 7,173,530 and U.S. patent application Ser. No. 11/009,691, entitled Dual Mode Reader Device and filed on Dec. 9, 2004 now abandoned. The contents of U.S. patent application Ser. Nos. 10/841,368 and 11/009,691 are hereby incorporated by reference in their entirety.

FIELD OF THE INVENTION

The present invention relates generally to tags for tracking containers and their contents and, more specifically, providing tags with combinations of active and/or passive tags for enhanced communication abilities.

BACKGROUND

Ever-increasing global trade underscores a modern global economy that depends on goods transported in a global supply chain. Generally, a global supply chain is a network of international suppliers, manufacturers, distributors, and other entities that handle goods from their component parts to consumer consumption. For example, semiconductor testing equipment is exported from the United States to Taiwan, where semiconductors are processed and then sent to Malaysia for assembly into computers. Subsequently, the computers are shipped to warehouses in the United States, and ultimately, to consumer outlets for consumption.

However, current tracking systems have difficulty tracking container contents because goods are nested within several containers during shipping and large shipping containers are stacked. For example, in terms of a nesting as defined by the ISO (International Standards Organization) item layers are packed into package layers, which are in turn stored in carton layers. Several carton layers are stored in a unit load layers, and several unit load layers are stored in container layers. In addition, containers are stacked several layers deep. Note that "container" is used here in a broader sense that includes each ISO layer and other enclosures. A vehicle transports several container layers at a time. Thus, an operator can only assume that an item is on a vehicle based on static nesting and stacking information collected during packing. Accordingly, if the goods were stolen during shipment, or lost by being shipped to a wrong location, it is not possible to discover the missing goods until each layer of container is opened at a consignee.

While a container configuration such as the above is used for purposes of description herein, the present invention is applicable to any grouping and any number of levels of sub-grouping.

A related problem is that current tracking systems have no real-time information for tracking container contents, especially at the item-layer. Because physical contents travel separately from data about the contents, the tracking system is not able to provide dynamically verified information about contents. A port operator needing to know the contents of the container must log-in to the tracking system to retrieve static information. Moreover, the data about contents is often delayed and, thus, the operator may not even be able to retrieve some information.

Additionally, many large consumer stores are requiring that products use RFID (Radio Frequency IDentification) tags in order to improve supply chain efficiency sufficient for just in time merchandise stocking. But these tags are typically heterogeneous and, thus not suitable to intra-tag communication. Thus, conventional tags wait until acted upon from a tag reader by passively outputting information to a centralized system. It is this centralized system that traditionally determines any relationship between goods.

In addition, heterogeneous tags traditionally require separate tag readers for each tag type. For example, for containers including both active and passive type tags, a separate device is required to obtain information from each tag type. Thus, in addition to the need for two separate devices for reading these tags, separate readers provide no information about the inter-relationship between the heterogeneous tag types.

Therefore, what is needed is an integrated device that provides robust communication abilities across passive and active channels.

SUMMARY

The present invention provides systems and methods for providing expanded compatibility in identification tags such as RFID (Radio Frequency Identification) devices. In one embodiment, integrated devices can be equipped with various combinations of passive and active tags configured for compatibility with passive and active readers, respectively. Additionally, the integrated devices can be equipped with various combinations of passive and active tag readers for compatibility with passive and active tags, respectively. A first combination comprises an active tag and a passive tag reader for collecting information over a passive communication channel, and sending the information over an active communication channel. A second combination comprises an active tag and a passive tag receiver/transceiver for communication over both active and passive communications channels. A third combination comprises an active tag and an active tag reader for collecting information over an active communication channel, and sending information over an active communication channel. A fourth combination comprises a passive communications detector, a passive receiver and an active tag transceiver for detecting activity over a passive channel and then receiving and storing related data.

In one embodiment, nested containers can be equipped with an integrated device that includes a combination of RFID communication capabilities. The nested containers usually have other containers associated with them, such as containers packaged within or adjacent containers. For example, a pallet can be a nested container that supports a number of boxes. The nested container collects information related to the associated containers.

In another embodiment, a location or tracking system can use signposts to send out short range pulses over a passive communication channel, at various locations. When the integrated device detects the pulse using a passive tag or a passive reader, identification information can be transmitted using a long range signal over an active channel.

In still another embodiment, a passive device can be used to complement the active tag. For example, a passive tag can detect communications from passive communication devices such as passive readers. In response, the passive tag can awaken the active tag for further actions (e.g., processing or transmission over an active channel). In another example, a passive transceiver can serve as a back-up transmission device in case of a failure in an active tag. The passive and active tags can be coupled to the same memory device allowing data to be read or written by either tag.

The features and advantages described herein are not all inclusive, and, in particular, many additional features and advantages will be apparent to one skilled in the art in view of the drawings, specifications, and claims. Moreover, it should be noted that the language used in the specification has been principally selected for readability and instructional purposes and may not have been selected to circumscribe the claimed invention.

One skilled in the art will recognize that these Figures are merely examples of the operation of the invention according to one embodiment and that other configurations and modes of operation can be used without departing from the essential characteristics of the invention.

DETAILED DESCRIPTION

A system and method for providing expanded compatibility in identification tags are disclosed. For example, integrated devices can include components to communicate with both active and passive devices in a global supply chain which uses both active and passive RFID (Radio Frequency IDentificaton) technologies. As a result, integrated devices can be tracked across heterogeneous elements of the global supply chain that can use one or more of passive and active tag readers as described below with respect to FIG. 1. One of ordinary skill in the art will recognize other applications for location tracking and inventory management made possible by the integrated devices described herein. For example, the integrated device can be used in a system for location tracking that uses passive RFID signposts. The passive receiver in the integrated device can awaken an active transceiver for sending location information.

Figure 1:
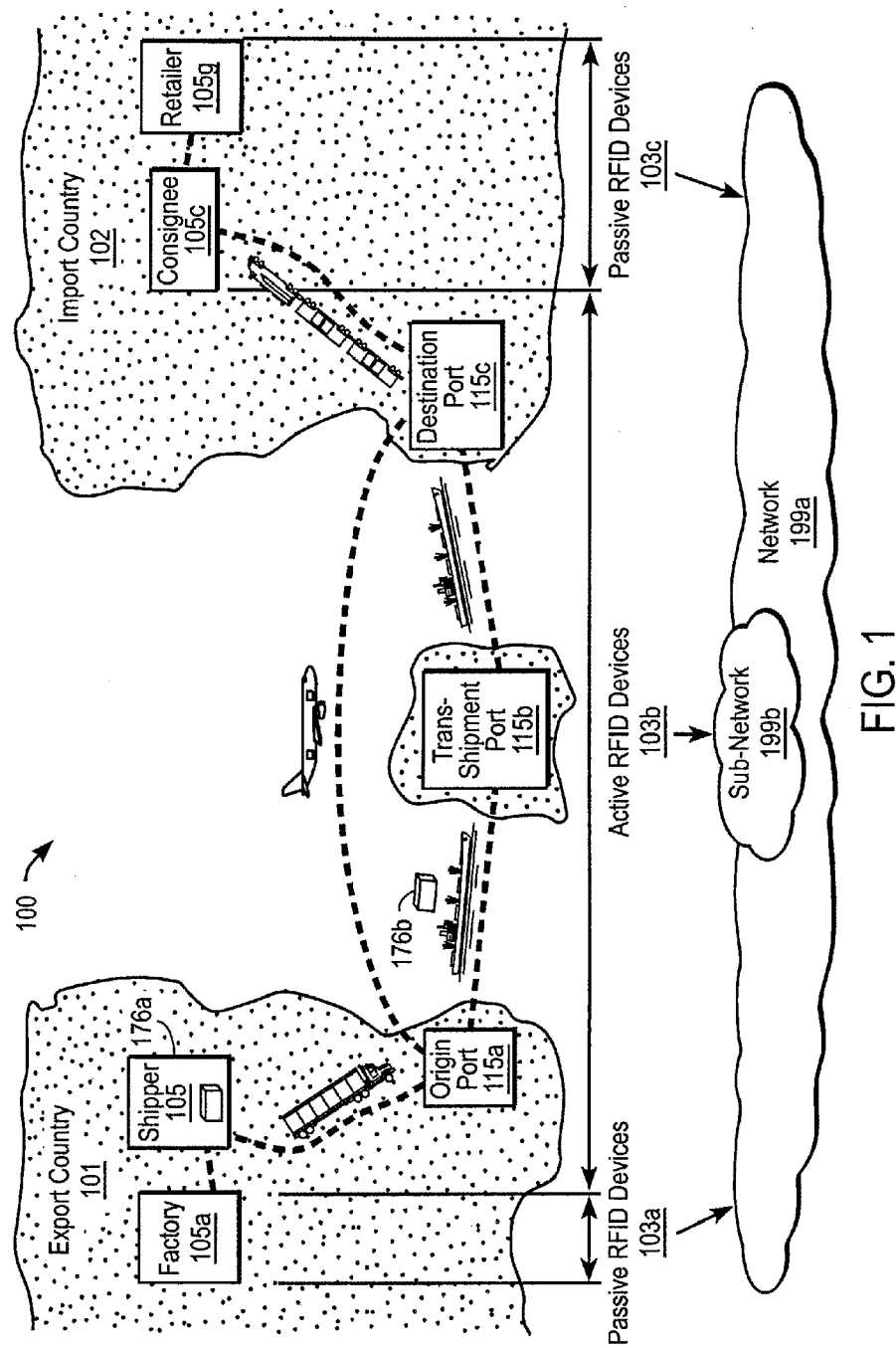
FIG. 1 is a schematic diagram illustrating an exemplary global supply chain with respect to RFID technologies according to one embodiment of the present invention.

FIG. 1 is a schematic diagram illustrating an exemplary global supply chain 100 with respect to RFID devices 103a,b according to one embodiment of the present invention. Note that FIG. 1 is merely an example global supply chain 100 that can have various geographical configurations, modes of transport, and RFID technologies etc. within the scope and spirit of the present invention. The global supply chain 100 comprises a factory 105a, a shipper 105b, an origin port 105c, a transshipment port 105d, a destination port 105e, a consignee 105f, and a retailer 105g. As shown in FIG. 1, the global supply chain 100 uses a combination of both passive and active RFID devices 103a,b. In particular, the factory 105a, the consignee 105f and the retailer 105g (sometimes called the "last mile") are using both passive and active RFID devices 103a,b, while the shipper 105b, the origin port 105c, the trans-shipment port 105d, the destination port 105e are using active RFID devices 103b, and retailer 105g is using passive RFID devices 103a. The passive RFID devices 103a are coupled in communication with a network 199a and the active RFID devices 103b are coupled in communication with a sub-network 199b. In one embodiment, combination RFID devices can be used to provide end-to-end visibility, and item-layer visibility, of the nested container 185 and other goods traveling through the global supply chain 100.

The global supply chain 100 is used by a network of international suppliers, manufacturers, distributors, consumer outlets, and other entities that handle goods from their component parts to consumer consumption. Accordingly, nested containers 185 and other cargo pass through the network points, checkpoints, ports, etc. The shipper 105b and the consignee 105f can be direct or indirect partner entities or units within a single entity exchanging a container though a trade route. For example, a manufacturer sends computer components to an assembly plant by truck freight, which in turn ships assembled computers to a warehouse. The origin and destination ports 105c-d can be a shipping dock, an airport, a customs agency, an NVOCC (Non-Vessel Operating Common Carrier) or any other entity that sends and/or receives goods over a trade route. An internal supply chain is a similar network operated by a single entity or closely-associated entities At a high-level, the factory 105a can transport a nested container 185 to the retailer 105g via one of many trade routes. As a first mode of transportation, a truck transports the nested container 185 from the factory 105a to the shipper 105b and then to the origin port 105c. As a second and a third mode of transportation, a first vessel and a second vessel transport the nested container 185 from the origin port 105c to the destination port 105e with a transfer at a transshipment port 105d. As a fourth mode of transportation, a freight train transports the container to the consignee 105f. In the case of international transportation, governmental agencies of the corresponding countries 101, 102, such as a Customs and National Security Agencies, exercise oversight over components of the primary network while private parties exercise oversight over components of the extended network. Note that, however, in one embodiment, the transportation occurs within the borders of a single country. As such, exporting and importing is between intranational geographical locations (e.g., between two states, cities, provinces, etc.) overseen by, for example, a security agency or an intranational governmental agency. Problematically, checkpoints cannot easily gather information about typical containers having other containers layered therein.

In one embodiment, the nested container 185 can provide nested visibility using combination RFID devices as described in more detail below. Accordingly, the nested container 185 acts as an agent by autonomously gathering and processing information for presentation to the central system. The nested container 185 associates itself with neighboring containers to form a relative hierarchy of logistical units. The relative hierarchy accounts for containers of higher layers and containers of lower layers. Preferably, a nested container 185 at the highest layer outputs the relative hierarchy in response to interrogations, however, any layer can do so. In one embodiment, the nested container 185 enables a master status upon determination that it is at the highest layer. In another embodiment, the nested container 185 updates the relative hierarchy upon detecting changes in composition (e.g., when a previously nested container fails to respond to a periodic poll).

As used herein, "layers" within the hierarchy can be defined in a variety of ways. Generally, each layer is capable of identifying itself in response to an interrogation, and is defined relative to other layers. A lower layer is capable of being contained within a higher layer. For example, an item or good at a first layer is contained within its packaging at a second layer, and a packaging is contained within a carton of layer three. A spectrum of layers can extend from an item and at the lowest layer to a vehicle at the highest layer. Preferably, less capable automatic identification technologies, such as bar codes, are within lower layers, and more capable automatic identification technologies, such as active and/or combination RFID tags, are within higher layers. In one embodiment, the nested container 185 comprises a smart container as described in U.S. patent application Ser. No. 10/841,407.

As the nested container 185 travels on its route through the global supply chain 100, it may be interrogated at different checkpoints as described below with respect to FIGS. 2A-C and 6A-C. When a truck is unloaded at the origin port 105c, pallets that were once associated can become separated and possibly reassociated. Since the truck is no longer the highest layer of the hierarchy, the nested containers 185 of relatively lower layers are able to provide similar information to an interrogator (e.g., a passive or an active reader). Further embodiments of nested containers 185 and methods operating therein are described in below.

Figure 2A:
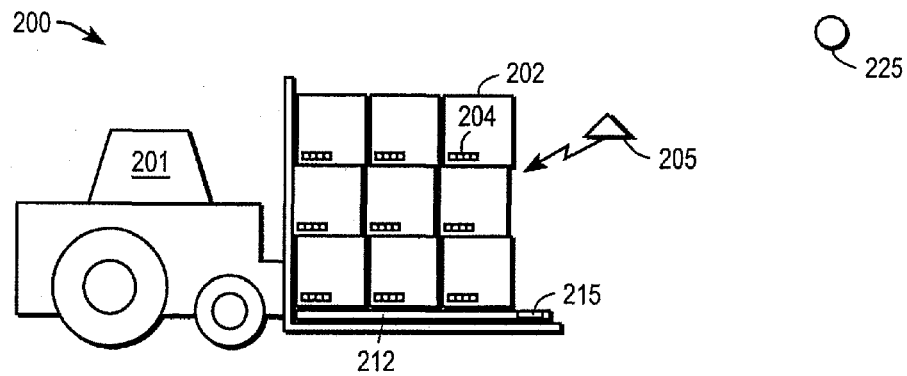
FIGS. 2A-C are schematic diagrams illustrating a system for collecting identification information in the global supply chain of FIG. 1 according to a first embodiment of the present invention.
Figure 2B:
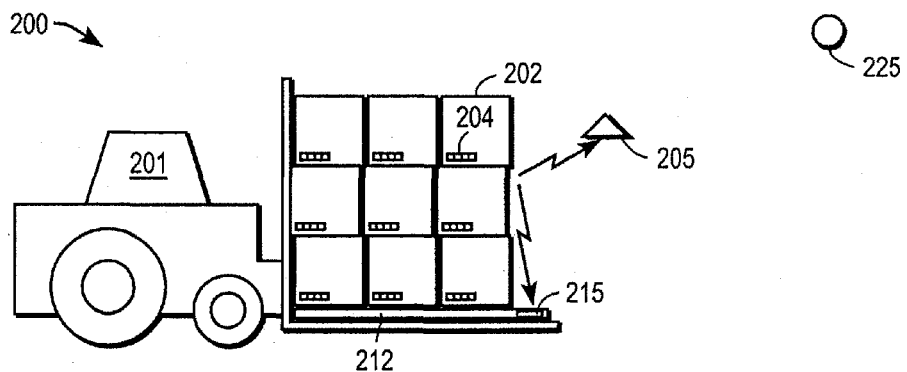
Figure 2C:
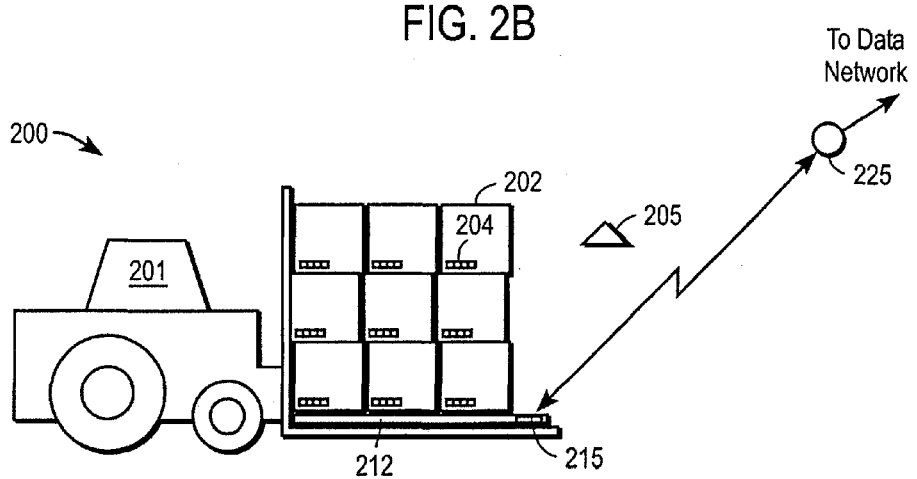

FIGS. 2A-C are schematic diagrams illustrating a system 200 for collecting identification information in the global supply chain 100 of FIG. 1 according to a first embodiment of the present invention. The system 200 comprises a forklift 201, a passive tag reader 205, and an active tag reader 225. The forklift 210 is supporting a pallet 212 with an integrated device 215, and the pallet 212 is holding a number of containers 202 with tags 204. The tags 204 can store information used for purposes such as location tracking, security state tracking, inventory management, manifests, and the like, as described herein. In FIG. 2A, the passive tag reader 205 sends out an interrogation signal to the tags 204. In FIG. 2B, the integrated device 215 observes and stores responses to the interrogation signal. Finally, in FIG. 2C, the active tag reader 225 interrogates the integrated device 215 for information derived from the responses.

The forklift 210 is just one example of many different modes of transport, as discussed above with respect to FIG. 1. In addition, the pallet 212 is just one example of the nested container 185 from FIG. 1 by serving as a centerpiece for the containers 202. From a different perspective, any one of the containers 202 can be an example of the nested container 202 by serving as a package for one or more additional containers. For example, the containers 202 can be packed with tagged household items. The tags 204 can be passive tags, active tags, or dual mode tags as described in U.S. patent application Ser. No. 11/009,691. Overall, one of ordinary skill in the art will recognize that FIGS. 2A-C illustrate one application of the integrated device 215 and many other uses will be apparent.

The passive tag reader 205 comprises physical, logical, analog, and/or digital communications components necessary to send and receive information from the tags 204 which are passive type tags (e.g., a transceiver and an antennae). The passive tag reader 205 can be, for example, a UHF (ultra high frequency) transceiver manufactured by Symbol Technologies of Oakland, Calif. In one embodiment, the information can be merely an identification number that is associated with a tag. In another embodiment, the information can be layer information used for nested visibility. The passive tag reader 205 can be configured to transmit the information over relatively short distances (e.g., 30 feet) in comparison to the active tag reader 225. The information can be transmitted over various frequencies, such as 860 to 960 MHz, or 13.56 MHz. In one embodiment, the passive tag reader 205 sends out an interrogation signal that triggers a response from the passive tags of tags 204. When the responses are sent back, the passive tag reader 205 can, in turn, pass the information to a local or remote data processor.

Some embodiments of the integrated device 215 are described in further detail below with respect to FIGS. 3-5. As described therein, the integrated device 215 can be configured to communicate with both passive and active signals. With respect to passive signals, the integrated device 215 is configured to recognize the interrogations signals sent out by the passive tag reader 205, and additionally, to receive and store the responses sent out by the tags 204. In one embodiment, the integrated device 215 collects and store the information as received, until queried to pass the information on to the active tag reader 225 for processing. In another embodiment, the integrated device 215 provides at least some pre-processing. For example, the integrated device 215 can determine a relative hierarchy of containers within the nested container 185. With respect to active signals, the integrate device is configured to respond to interrogations sent out by active tag reader 225. The responses sent by the integrate device 215 to the active tag reader 225 are based on the response received by the integrated device from the passive tags 204.

The active tag reader 225 comprises physical, logical, analog and/or digital communication components necessary to send and receive information from the integrated device 215 (e.g., a transceiver, an antennae, and a power source). The active tag reader 225 can also be a UHF transceiver, but can be configured to transmit over a range of hundreds of feet over frequencies such as 433 MHz or 2.4 GHz. In one embodiment, the active tag reader 225 is configured to send an interrogation signal that triggers a response from active tags within range, such as the integrated device 215.

Figure 3:
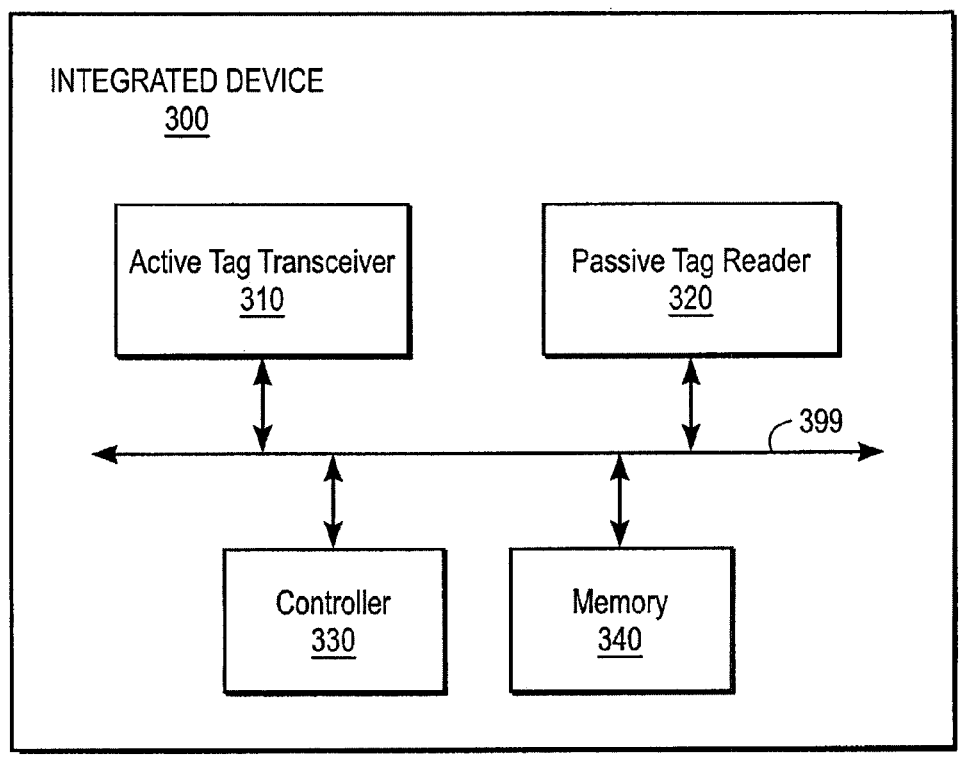
FIG. 3 is a block diagram illustrating an integrated device from FIGS. 2A-C according to a first embodiment of the present invention.
Figure 4:
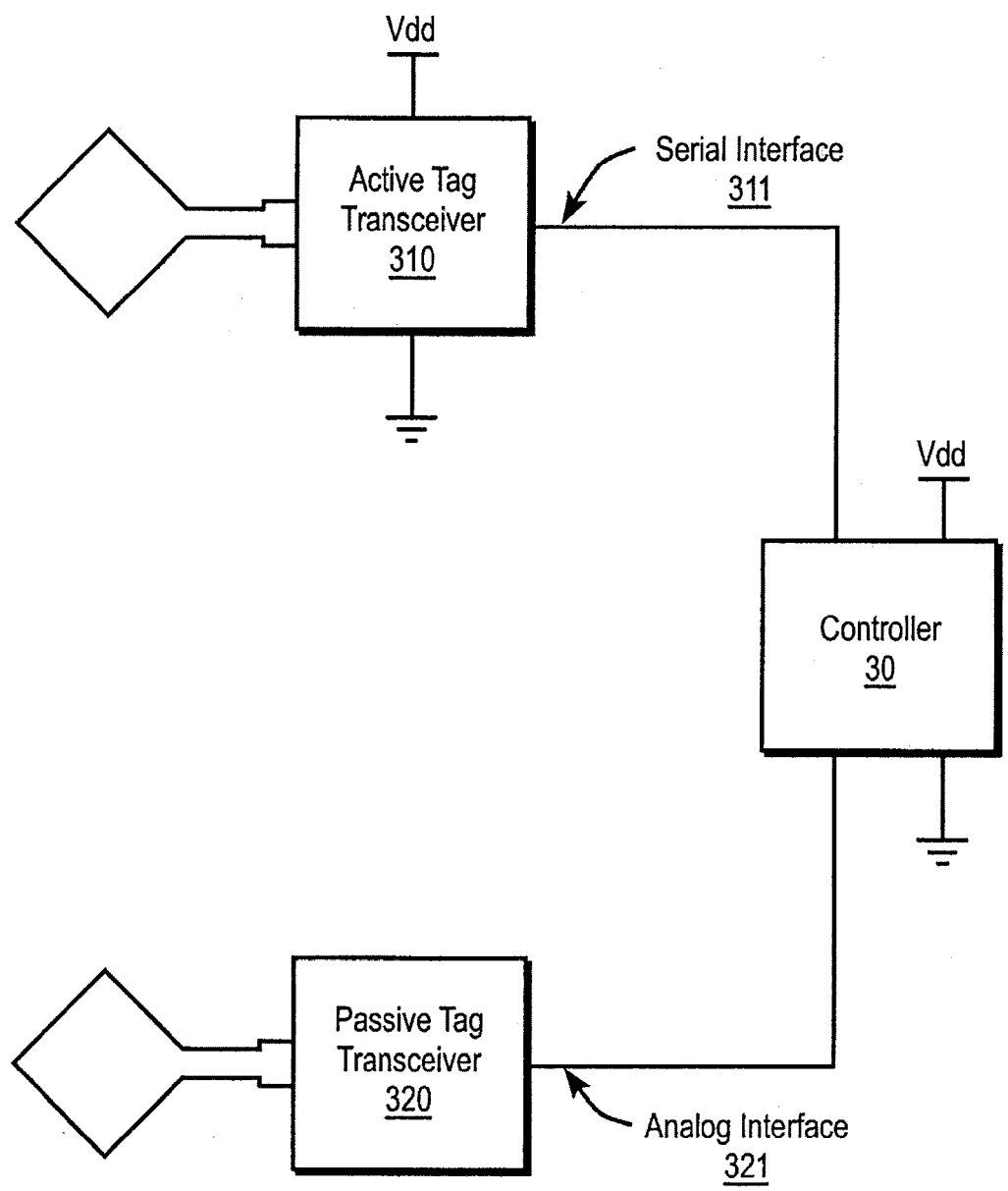
FIG. 4 is a schematic diagram illustrating the integrated device of FIG. 3 according to one embodiment of the present invention.

FIG. 3 is a block diagram illustrating an integrated device 300 which is one embodiment of the integrated device 215 of FIGS. 2A-C. The integrated device 300 comprises an active tag transceiver 310, a passive tag reader 320, a controller 330, and a memory device 340 (e.g., DRAM, SRAM, or flash memory). Note that in some embodiments of FIG. 3 (and similarly with components of other FIGURES described herein), the active tag transceiver 310, a component, can be an active tag, a complete device. These components can be coupled in communication via a bus 399 (e.g., trace lines). The integrated device 300A can be implemented in, for example, one or more integrated circuits or on a circuit board. In some embodiments, as described in FIG. 4, some components may be directly connected.

The active tag transceiver 310 can be a battery-powered UHF transceiver that is compatible for communications with the active tag reader 225 of FIGS. 2A-C. For example, the active tag transceiver 310 can operate in accordance with the ISO 18000-7 standard utilizes an integrated 433 MHz RF transceiver with FSK modem with a serial interface 311 as shown in FIG. 4. In another example, the active tag transceiver 310 can operate at 2.4 GHz.

Likewise, the passive tag reader 320 can be a UHF or HF (high frequency) transceiver that is compatible for receiving communications from the tags 204 of FIGS. 2A-C. Examples of HF transceivers can be found from manufacturers such as Philips Semiconductors.

The controller 330 can be, for example, a central processing unit, or a representation of various logic spread around the integrated device 215A. The controller 330 can be implemented in hardware (e.g., an integrated circuit) and/or software (e.g., program instructions). In one embodiment, the controller 330 processes data and instructions related to both the active tag transceiver 310 and the passive tag reader 320. For example, the controller 310 can extract data from responses observed by the passive tag reader 320, transform the extracted data into a tabular format, and add as an entry to a table stored the memory device 340. The controller 310 can also retrieve and export the table, with all of its entries, through the passive tag reader 320. In some embodiments, the controller 330 can immediately pass data from the passive tag reader 320 to the active tag transceiver 310 without storage.

Figure 5:
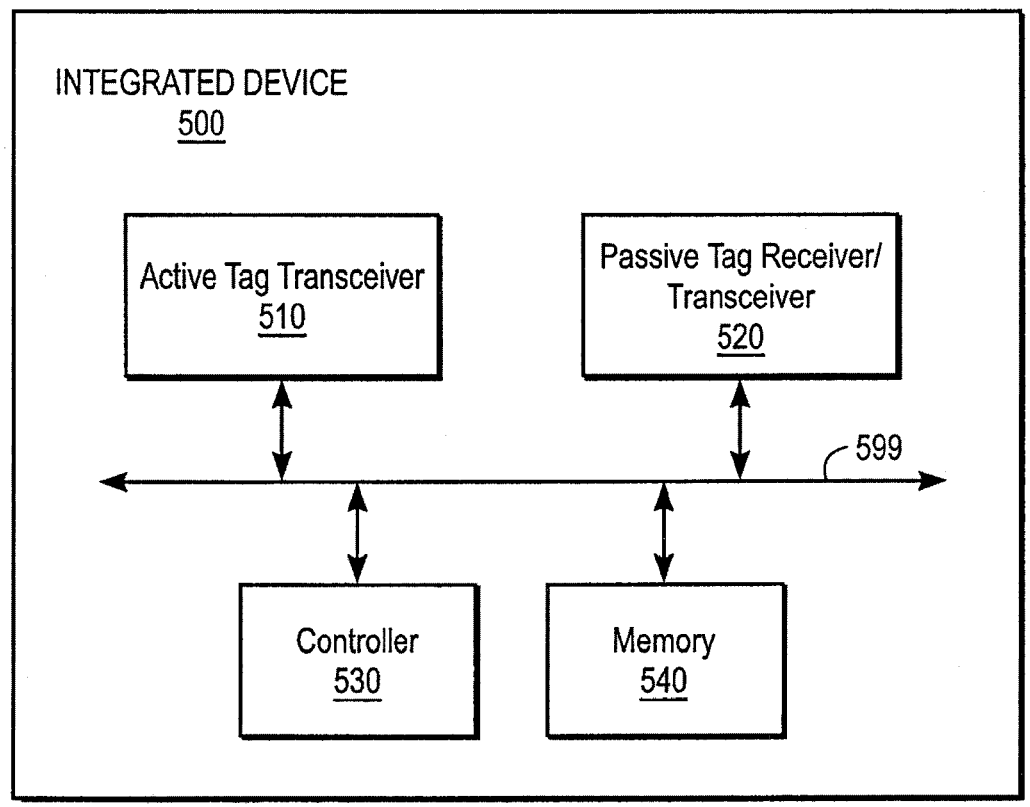
FIG. 5 is a block diagram illustrating an integrated device according to a second embodiment of the present invention.

FIG. 5 is a block diagram illustrating an integrated device 500 which is another embodiment of the integrated device 215 of FIGS. 2A-C. The integrated device 215B comprises an active tag transceiver 510, a controller 530, and a memory device 540 that are similar to those described above with respect to FIG. 3. However, the integrated device 215B further comprises a passive tag transceiver 520. The active tag transceiver 510 and the passive tag transceiver 520 are both coupled to the memory device 540. In some embodiments, the passive tag transceiver 520 does not require an external power source. Accordingly, the tag transceiver 520 uses electromagnetic energy from the received signal for processing.

The passive tag transceiver 520 allows the integrated device 300B to transmit over passive frequencies, in addition to receiving. In one embodiment, the passive tag transceiver 520 transmits as a redundant link in response to a failure in the active tag transceiver 510. For example, the active tag transceiver 510 can store data in the memory device 540. Responsive to a power failure or a communication device failure of the active tag transceiver 510, the passive tag transceiver 520, having access to the memory device 540, is able to continue communication the same data over a passive channel. In another embodiment, the passive tag transceiver 520 allows spot location to be performed through responding in-band directly to the passive tag reader. To avoid interference with neighboring passive RFID readers, the active tag transceiver 510 can reduce the receiver sensitivity and transmission power controlled to be consistent with the read range of passive tags.

In another embodiment, the passive tag transceiver 520 can detect pulses sent out by signposts over a passive communication channel. In response, the passive tag transceiver 520 can awaken the active tag transceiver 510 directly, or indirectly by action of the controller 530. The active transceiver 510 can then send out location information to a centralized tracking system.

Figure 6A:
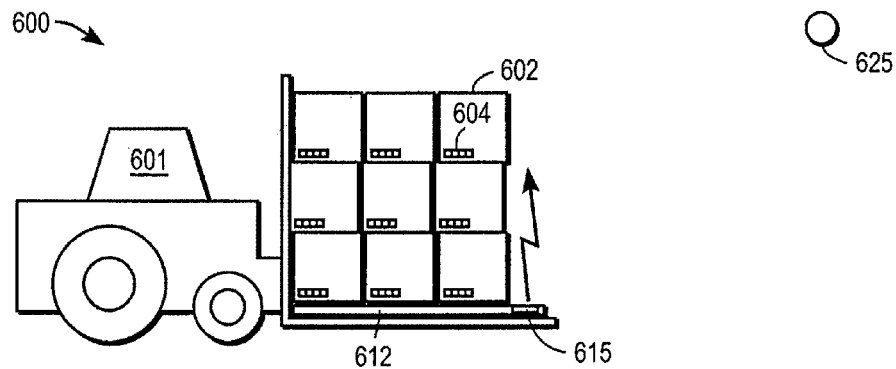
FIGS. 6A-C are schematic diagrams illustrating a system for collecting identification information in the global supply chain of FIG. 1 according to a second embodiment of the present invention.
Figure 6B:
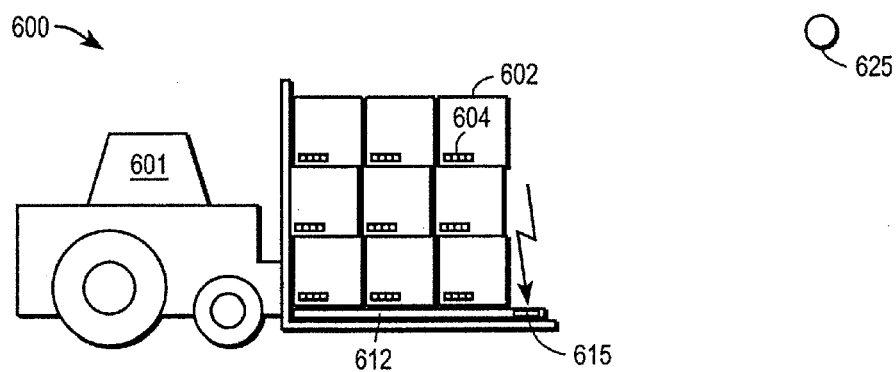
Figure 6C:
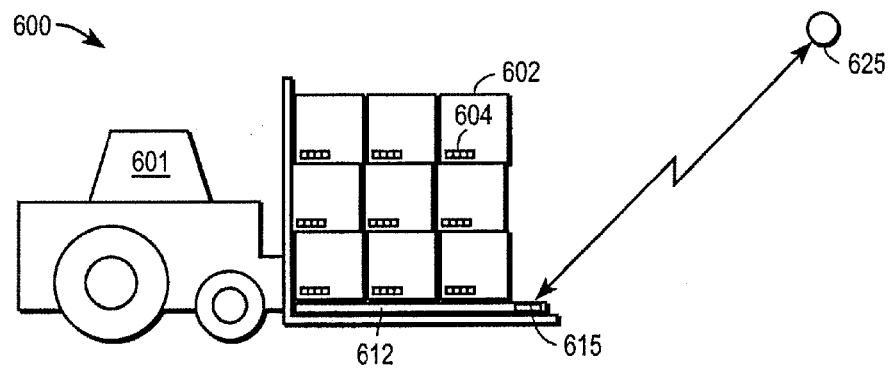

FIGS. 6A-C are schematic diagrams illustrating a system 600 for collecting identification information in the global supply chain 100 of FIG. 1 according to a second embodiment of the present invention. The system 600 comprises a forklift 601 and an active tag reader 625. The forklift 601 is supporting a pallet 612 with an integrated device 615, and the pallet 612 is holding a number of containers 602 with tags 604. In FIG. 6A, the integrate device 615 interrogates the tags 604, and receives responses from the tags in FIG. 6B. In FIG. 6C, the active reader 625 interrogates the integrated device 615 to get information related to the tags 604.

Figure 7:
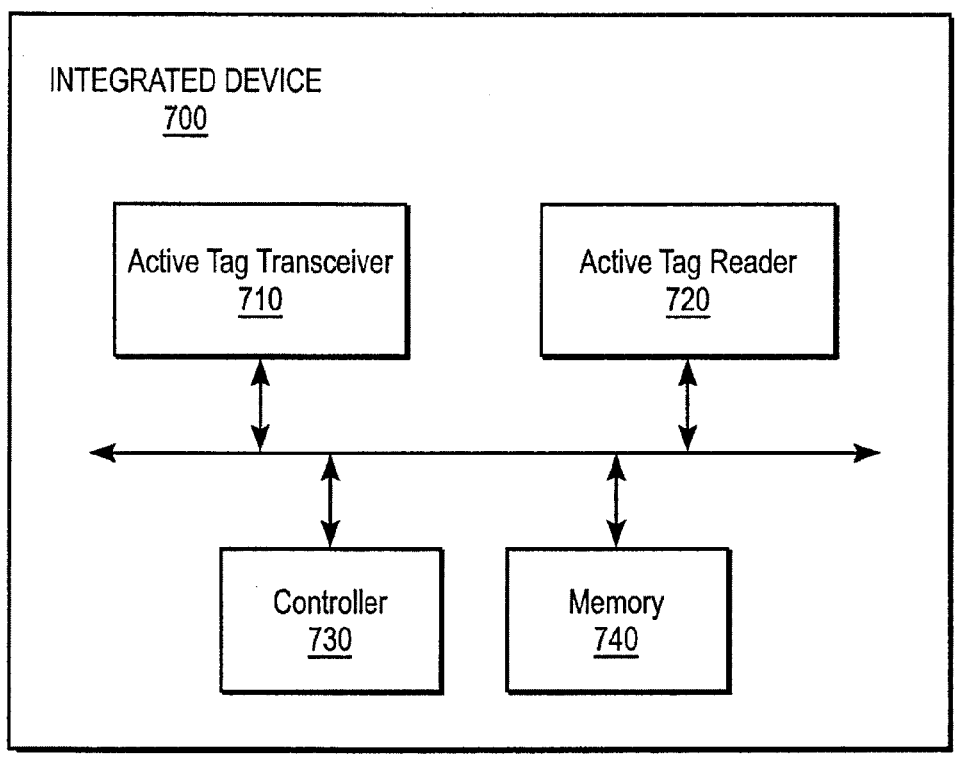
FIG. 7 is a block diagram illustrating an integrated device from FIGS. 6A-C according to a third embodiment of the present invention.

The integrated device 615 is shown in more detail in FIG. 7. In addition to an active tag transceiver 710, a controller 730, and a memory 740, the integrated device 615 also includes an active tag reader 720. The active tag reader 720 can be a UHF transceiver as discussed above with respect to FIG. 3. The active tag transceiver 710, the controller 730, and the memory 740 can be similar to the components of FIGS. 3 and 5 describe above.

In one embodiment, the active tag reader 720 collects information about the containers 202 from active tags within the tags 604. Optionally, the integrated device 615 can put the tags 604 to sleep once the information has been completed in order to conserve power. The integrated device 615 can be positioned to communicate with the tags 704 which may be inaccessible by an outside tag reader such as the active tag reader 725. For example, radio waves may not propagate effectively through a metal container. Thus, the reader portion of the integrated device 615 can be positioned inside the metal container (e.g., can be manufactured to be integral with the metal container, or a hole can be cut for retrofitting).

Figure 11:
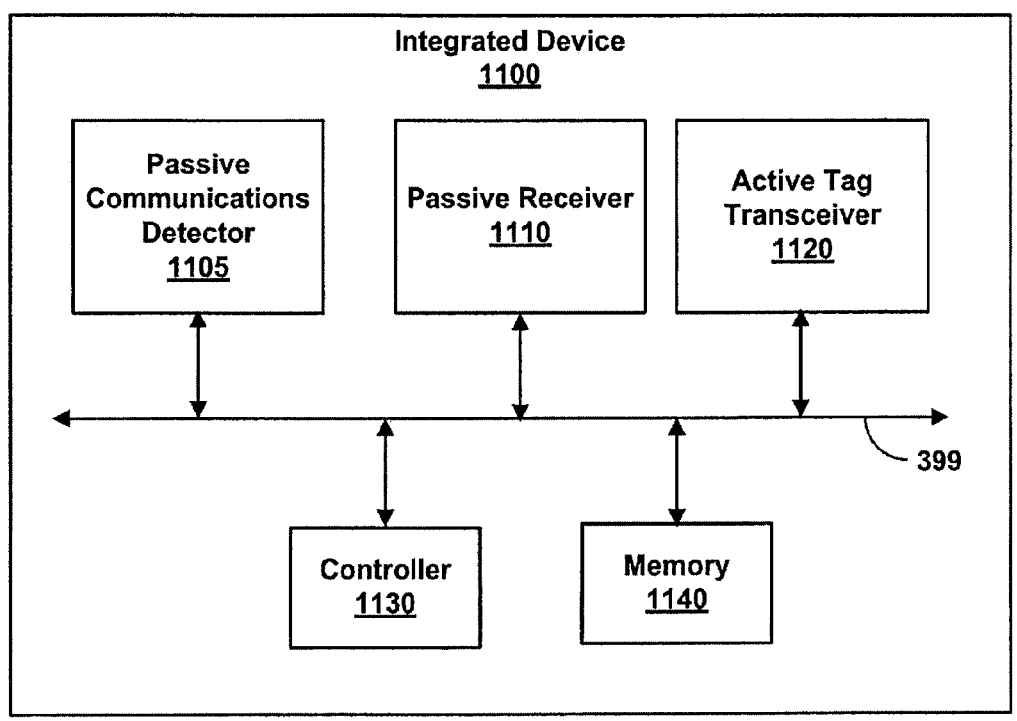
FIG. 11 is a schematic diagram illustrating an integrated device according to a fourth embodiment of the present invention.

FIG. 11 is a schematic diagram illustrating an integrated device 1100 according to another embodiment of the present invention. The integrated device 1100 comprises a passive communications detector 1105, a passive tag receiver 1110 (or transceiver), an active tag transceiver 1120, a controller 1130, and a memory 1140.

The passive communications detector 1105 can detect or sense activity on one or more passive communication channels, such as those used by passive tags. In one embodiment, the passive tag receiver 1110 requires (battery or other) power, and the passive communications detector can use power from passive communications to power up or activate the passive tag receiver 1110. In another embodiment, the passive tag receiver 1110 does not require power as it can be activated from energy derived from the passive communications. After activation, the passive tag receiver 1110 can receive the passive communications (e.g., demodulate and decode) into the integrated device 1100. In one embodiment, the active tag transceiver 1120 stores data related to the passive communications in the memory 1140. In another embodiment, the active tag transceiver 1120 is configured to process the data, for example, to create a relative hierarchy.

Figure 8:
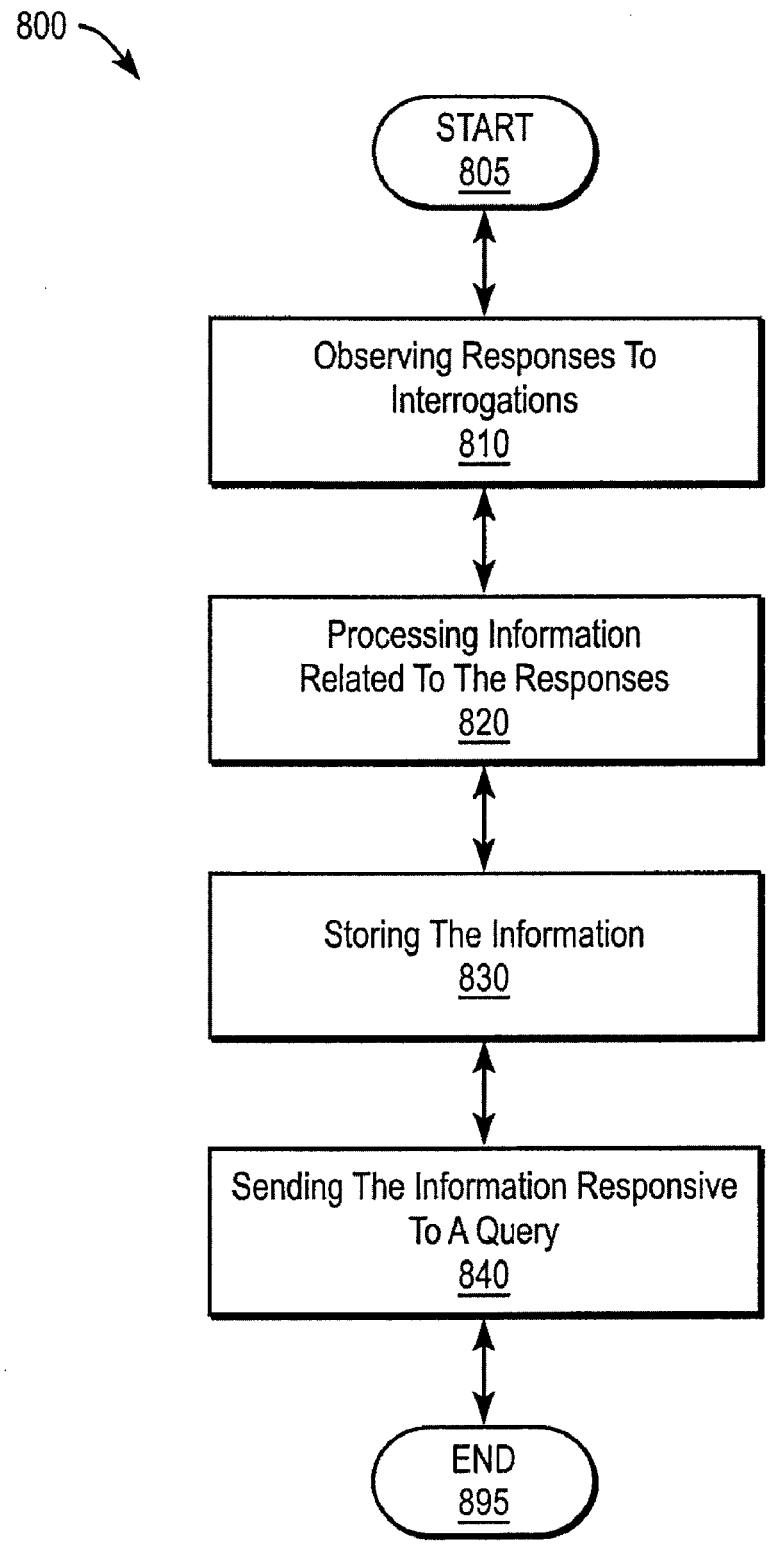
FIG. 8 is a flow chart illustrating a method for providing expanding compatibilities of an RFID tag according to a first embodiment of the present invention.

FIG. 8 is a flow chart illustrating a method 800 for providing expanding compatibilities of an RFID tag according to a first embodiment of the present invention. The method 800 can be implemented in, for example, the system 200 or 600. The integrated device 215 or 615 observes 810 responses to interrogatories by listening to a frequency used by passive tags (e.g., 900 MHz). The interrogatories can be sent by the passive tag reader 205, and the responses sent by the tags 205.

The controller 330 or 530 of the integrated device 215 processes 820 the information related to the responses. In one embodiment, processing includes recovering the information from native signal formats (e.g., serial or analog). In another embodiment, processing includes providing nested visibility as described further with respect FIGS. 9-10 below. Also, the controller 330 or 530 stores 830 the information in the memory device 340 or 540.

The integrated device 215 or 615 sends 840 the information responsive to a query from the active tag reader 225. For example, the forklift 201 can be moving past a warehouse door that is equipped with the active tag reader 225. Responsive to the forklift 201 tripping a detector, the active tag reader 225 can automatically send out an interrogation signal.

Figure 9:
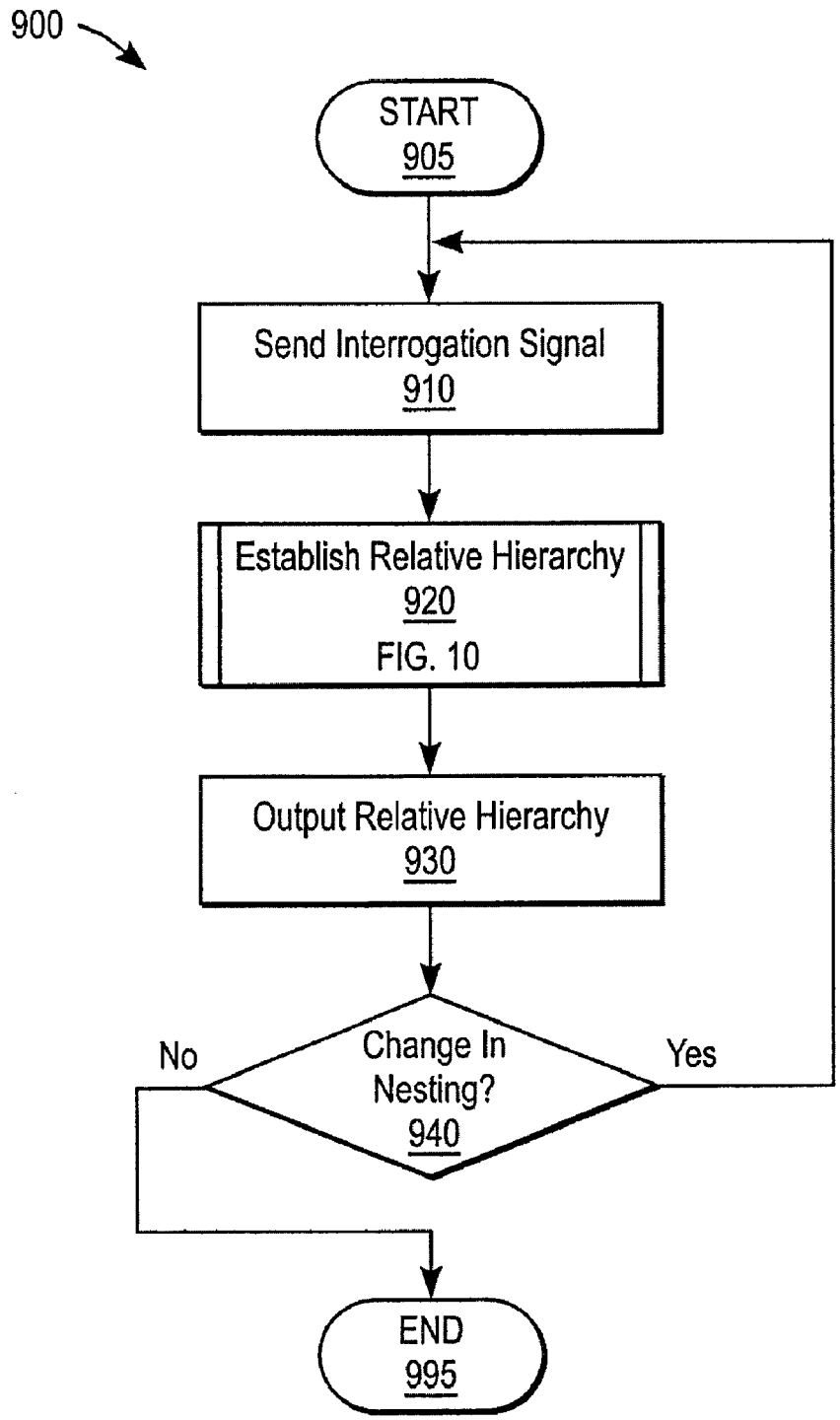
FIG. 9 is a flow chart illustrating a method for providing nested visibility according to one embodiment of the present invention.

FIG. 9 is a flow chart illustrating a method 900 for providing nested visibility according to one embodiment of the present invention. The passive tag reader 205 sends 910 an interrogation signal as discussed. The interrogation signal invokes a response of identification and layer information from nested and adjacent tags 204. In one embodiment, the interrogation signal also includes identification and layer information of the requestor. The controller 330 or 530 establishes 920 a relative hierarchy as discussed further below with respect to FIG. 10. The relative hierarchy based on responses to the interrogation signal provides visibility from that layer. The integrated device 215 or 615 outputs 930 the relative hierarchy to the active tag reader 225. The output can be in response to a regular communication with a reader, a specific interrogation signal, or due to a periodic publication to subscribers. The output may be to a portable deployment kit, an agent with a hand-held device, and the like. If there is a change in nesting 940 detected (e.g., by periodic polling), the system 600 can utilize the active tag reader 720 to repeats the process by sending 910 another interrogation signal.

Figure 10:
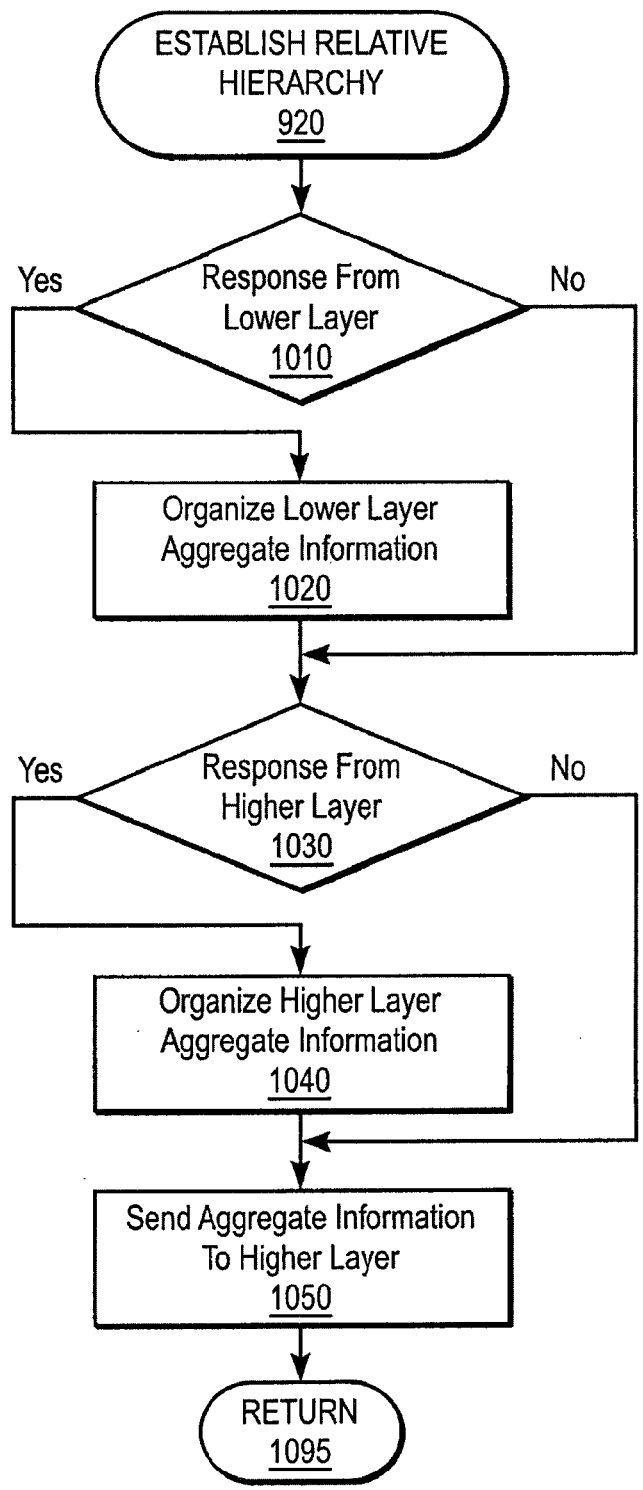
FIG. 10 is a flow chart illustrating a method for generating a relative hierarchy according to one embodiment of the present invention.

FIG. 10 is a flow chart illustrating the method 920 for establishing the relative hierarchy according to one embodiment of the present invention. The relative hierarchy is based on responses from neighboring nested containers 185. In one embodiment, association information can be pre-loaded at a checkpoint in the global supply chain 100. If the integrated device 215 or 615 receives responses from lower-layer containers 1010, it organizes 1020 these containers into lower-layer aggregate information. The aggregate information can comprise several layers to delineate a sub-hierarchy.

Likewise, the integrated device 215 or 615 receives responses from higher-layer containers 1030, it also organizes 1040 these containers into higher-layer aggregate information comprising several layers and a sub-hierarchy. In one embodiment, the a integrated device 215 or 615 sends 1050 aggregated information to known higher-layer containers. The integrated device 215 or 615 may also keep information about peer hierarchies that respond to the interrogation signal.

Because a many-to-many relationship exists among layers, some information can be duplicitous. Thus, the integrated device 215 or 615 of one embodiment recognizes and removes duplicitous material. The integrated device 215 or 615 of another embodiment uses duplicitous information for verification or reliability scoring. In one embodiment, the integrated device 215 or 615 resolves conflicting information through various methods such as using the highest-layer information, or using the directly obtained information.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can be a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. An integrated device for tracking a container, the device comprising:
a passive tag reader configured to receive responses from at least one of a plurality of passive tags in response to interrogations received at the one or more passive tags from an external tag reader;
an active tag, coupled in communication with the passive tag reader, the active tag configured to access information related to the responses; and
a controller, coupled in communication with the active tag and the passive tag reader, the controller configured to generate a relative hierarchy amongst the the plurality of passive tags from the information.

2. The device of claim 1, further comprising:
a controller, coupled in communication with the active tag and the passive tag reader, the controller configured to process the information to generate a manifest of other containers associated with the container.

3. The device of claim 1, wherein the passive tag reader is a RFID (Radio Frequency Identification) devices.

4. The device of claim 1, further comprising:
a memory device, coupled to both the passive tag reader and the active tag, the memory device configured to store the information received by the passive tag reader.

5. The device of claim 1, wherein the active tag comprises a transceiver configured to operate at least one of 433 MHz and 2.4 GHz.

6. The device of claim 1, wherein the passive tag reader comprises a transceiver configured to operate within a range of 860 MHz to 960 MHz or at 13.56 MHz.

7. The device of claim 1, wherein the active tag is further configured to send the information to a device external to the container.

8. The device of claim 1, wherein the active tag and the passive tag reader communicate using RFID (radio frequency identification).

9. The device of claim 1, wherein the passive tag reader is configured to wake the active tag responsive to receiving communications.

10. The device of claim 1, wherein the active tag and the passive tag reader are both integrated onto a single substrate of a semiconductor.

11. An integrated device comprising:
a memory device to store data;
an active tag, coupled in communication with the memory device, the active tag configured to communicate a portion of the stored data responsive to an interrogation; and
an passive tag, coupled in communication with the memory device, the passive tag configured to communicate a portion of the stored data responsive to an interrogation as a result of a failure in the active tag.

12. The device of claim 11, wherein the integrated device further comprises:
a controller, coupled in communication with the active tag and the passive tag, the controller configured to detect the failure in the active tag, and responsive to the failure, to route communications through the passive tag.

13. An integrated device for tracking a container, the device comprising:
a passive communication detector to detect passive communication activity from at least one of a plurality of passive tags;
a passive receiver, coupled to the passive communication detector, the passive receiver configured to receive data from the passive communication activity;
an active tag, coupled to the passive receiver, the active tag configured to store the data; and
a controller, coupled in communication with the active tag and the passive receiver, the controller configured to generate a relative hierarchy with respect to the the plurality of passive tags from the data.

14. The device of claim 13, wherein the passive communication detector comprises a passive tag.

15. In an integrated device, a method for tracking a container, the method comprising the steps of:
receiving responses from at least one of a plurality of passive tags in response to interrogations received at the one or more passive tags from an external tag reader;
providing access to information related to the responses to an active tag; and
generating a relative hierarchy with respect to the the plurality of passive tags from the information.

16. The method of claim 15, further comprising:
generating a manifest of other containers associated with the container from the information.

17. The method of claim 15, wherein receiving responses occur over an RFID (Radio Frequency Identification) channel.

18. The method of claim 15, wherein the passive tag further comprises a transmitter, and further comprising:
detecting a failure in the active tag, and responsive to the failure, communicating with the passive tag reader.

19. The method of claim 15, further comprising:
storing the information for access by both an passive tag reader and the active tag.

20. The method of claim 15, wherein the active tag comprises a transceiver configured to operate at at least one of 433 MHz and 2.4 GHz.

21. The method of claim 15, wherein the passive tag reader comprises a transceiver configured to operate within a range of 860 MHz to 960 MHz or at 13.56 MHz.

22. The method of claim 15, wherein the active tag sends the information to a device external to the container.

23. The method of claim 15, wherein the active tag and the passive tag reader communicate using RFID (radio frequency identification).

24. The method of claim 15, wherein the passive tag reader is configured to wake the active tag responsive to receiving communications.

25. The method of claim 15, wherein the active tag and the passive tag reader are both integrated onto a single substrate of a semiconductor.

26. In an integrated device, a method for tracking a container, the method comprising:
- receiving data from an active communication channel;
- storing the data in a memory device;
- communicating a portion of the stored data through an active tag on the active communication channel responsive to an interrogation; and
- communicating a portion of the stored data on a passive communication channel responsive to an interrogation as a result of a failure in the active tag.

27. In an integrated device, a method for tracking a container, the method comprising:
- detecting passive communication activity;
- activating a receiver to receive data from the passive communication activity;
- activating an active tag to store the received data; and
- generating from the data a relative hierarchy with respect to one or more passive tags associated with the passive communication activity.

* * * * *

UNITED STATES PATENT AND TRADEMARK OFFICE
CERTIFICATE OF CORRECTION

PATENT NO. : 7,755,486 B2
APPLICATION NO. : 11/535482
DATED : July 13, 2010
INVENTOR(S) : Liping Julia Zhu et al.

Page 1 of 1

It is certified that error appears in the above-identified patent and that said Letters Patent is hereby corrected as shown below:

In claim 1, Column 11, line 28, after "amongst" delete "the"

In claim 3, Column 11, line 37, delete "devices" and replace with --device--

In claim 11, Column 11, line 66, delete "an" and replace with --a--

In claim 13, Column 12, line 22, after "the" delete "the"

In claim 15, Column 12, line 34, after "the" delete "the"

In claim 19, Column 12, line 48, after "both" delete "an" and replace with --a--

Signed and Sealed this

Sixteenth Day of November, 2010

David J. Kappos
*Director of the United States Patent and Trademark Office*